(12) United States Patent
Ho et al.

(10) Patent No.: US 11,567,925 B2
(45) Date of Patent: Jan. 31, 2023

(54) CONCURRENT UPDATE MANAGEMENT

(71) Applicant: International Business Machines Corporation, Armonk, NY (US)

(72) Inventors: Kam Ho Ho, Daly City, CA (US); Lawrence Loong-Tak Law, Saratoga, CA (US); Helen Maria Witter, Morgan Hill, CA (US); Clifford Peter Chan, San Jose, CA (US); Patricia Hatami Mejia, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 16/676,951

(22) Filed: Nov. 7, 2019

(65) Prior Publication Data

US 2021/0141782 A1  May 13, 2021

(51) Int. Cl.
  *G06F 16/23* (2019.01)

(52) U.S. Cl.
  CPC ...... *G06F 16/2365* (2019.01); *G06F 16/2308* (2019.01); *G06F 16/2358* (2019.01); *G06F 16/2386* (2019.01)

(58) Field of Classification Search
  CPC ............. G06F 16/2365; G06F 16/2386; G06F 16/2308; G06F 16/2358
  See application file for complete search history.

(56) References Cited

U.S. PATENT DOCUMENTS

| | | | |
|---|---|---|---|
| 5,220,665 A | 6/1993 | Coyle, Jr. et al. | |
| 5,551,023 A | 8/1996 | Alonso | |
| 6,826,570 B1 | 11/2004 | Eshel et al. | |
| 7,260,575 B2 | 8/2007 | Dearing et al. | |
| 7,831,643 B1 | 11/2010 | Beloussov et al. | |
| 2004/0078360 A1 | 4/2004 | DeFauw | |
| 2009/0198694 A1 | 8/2009 | Thomas | |
| 2009/0307250 A1* | 12/2009 | Koifman | G06F 21/62 |
| 2014/0075138 A1* | 3/2014 | Doster | G06F 11/3034 |
| | | | 711/E12.103 |
| 2019/0340168 A1* | 11/2019 | Raman | G06F 16/2255 |

OTHER PUBLICATIONS

Ltd, Red Gate Software. "How to Version Control a Database Using GitHub and SQL Source Control." Redgate, Nov. 22, 2016, https://www.red-gate.com/hub/product-learning/sql-source-control/github-and-sql-source-control. (Year: 2016).*

(Continued)

*Primary Examiner* — Alex Gofman
*Assistant Examiner* — Erich Alexander Fischer
(74) *Attorney, Agent, or Firm* — James L. Olsen (57) ABSTRACT

Aspects of the present disclosure relate to managing concurrent updates on data. A transactional update on at least one record within a data set is detected. A log is generated for the transactional update, the log including an image of the at least one record within the data set before the transactional update. A batch update is detected. A determination is made whether the batch update collides with the transactional update by referencing the log. In response to determining that the batch update collides with the transactional update, a collision policy is referenced. A collision action indicated in the collision policy is then issued.

10 Claims, 6 Drawing Sheets

(56) References Cited

OTHER PUBLICATIONS

Chacon, S., & Straub, B. (2014). Pro Git. Git (2nd ed.). Apress. https://github.com/progit/progit2/releases/download/2.0.0/progit-2.0.0.pdf. (Year: 2014).*

Tukuyomi, "Script to compare file sizes", unix.com, Apr. 19, 2011, https://www.unix.com/shell-programming-and-scripting/158222-script-compare-file-sizes.html (Year: 2011).*

Mell et al., "The NIST Definition of Cloud Computing", Recommendations of the National Institute of Standards and Technology, Sep. 2011, 7 pages.

* cited by examiner

CONCURRENT UPDATE MANAGEMENT

BACKGROUND

The present disclosure relates generally to the field of data management, and in particular, to managing concurrent updates on data sets.

SUMMARY

Embodiments of the present disclosure relate to a method, system, and computer program product for managing concurrent updates on data. A transactional update on at least one record within a data set can be detected. A log can be generated for the transactional update, the log including an image of the at least one record within the data set before the transactional update. A batch update can be detected. A determination can be made whether the batch update collides with the transactional update by referencing the log. In response to determining that the batch update collides with the transactional update, a collision policy can be referenced. A collision action indicated in the collision policy can then be issued.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of data management, and in particular, to managing concurrent updates on data sets. While the present disclosure is not necessarily limited to such applications, various aspects of the disclosure can be appreciated through a discussion of various examples using this context.

Collisions occur when multiple entities (e.g., applications) attempt to update a data set at the same time. This most frequently occurs when a batch update initiates while a transactional update is processing. Current solutions to address collisions include processing separate structures of the same data set with serialization, failing the contending updates on the same structure, or fencing the data sets with a fencing mechanism (e.g., a latch, lock, or enqueue). These existing methodologies aim to prevent collisions by avoiding concurrent update activities. However, they generally incur unnecessary overhead and wait time.

Aspects of the present disclosure address the aforementioned complications via an update management system. The update management system can be configured to manage concurrent updates to data. A transactional update on at least one record within a data set can be detected at a first time. A log can be generated for the transactional update, the log including an image of the at least one record within the data set before the update and an image of the at least one record within the data set after the update. A batch update can be detected at a second time. A determination can be made whether the batch update collides with the transactional update by referencing the log. In response to determining that the batch update collides with the transactional update, a collision policy can be referenced. A collision action indicated in the collision policy can then be issued.

Aspects of the present disclosure are advantageous to existing techniques for preventing collisions. For example, fencing techniques require additional processing time as data affected by a first update can be blocked from being updated even if a second prospective update is not likely to conflict with the first update. Aspects of the present disclosure do not require locking data. As such, aspects of the present disclosure reduce processing time associated with fencing. As another example, simply failing contending updates requires the system to re-attempt the updates at a future time, which results in wasted time in situations where the first and second updates are both permitted to be committed without issues. Aspects of the present disclosure allow for the analysis of the data affected by both updates and permits such updates to concurrently occur without causing issues such as corruption.

Figure 1:
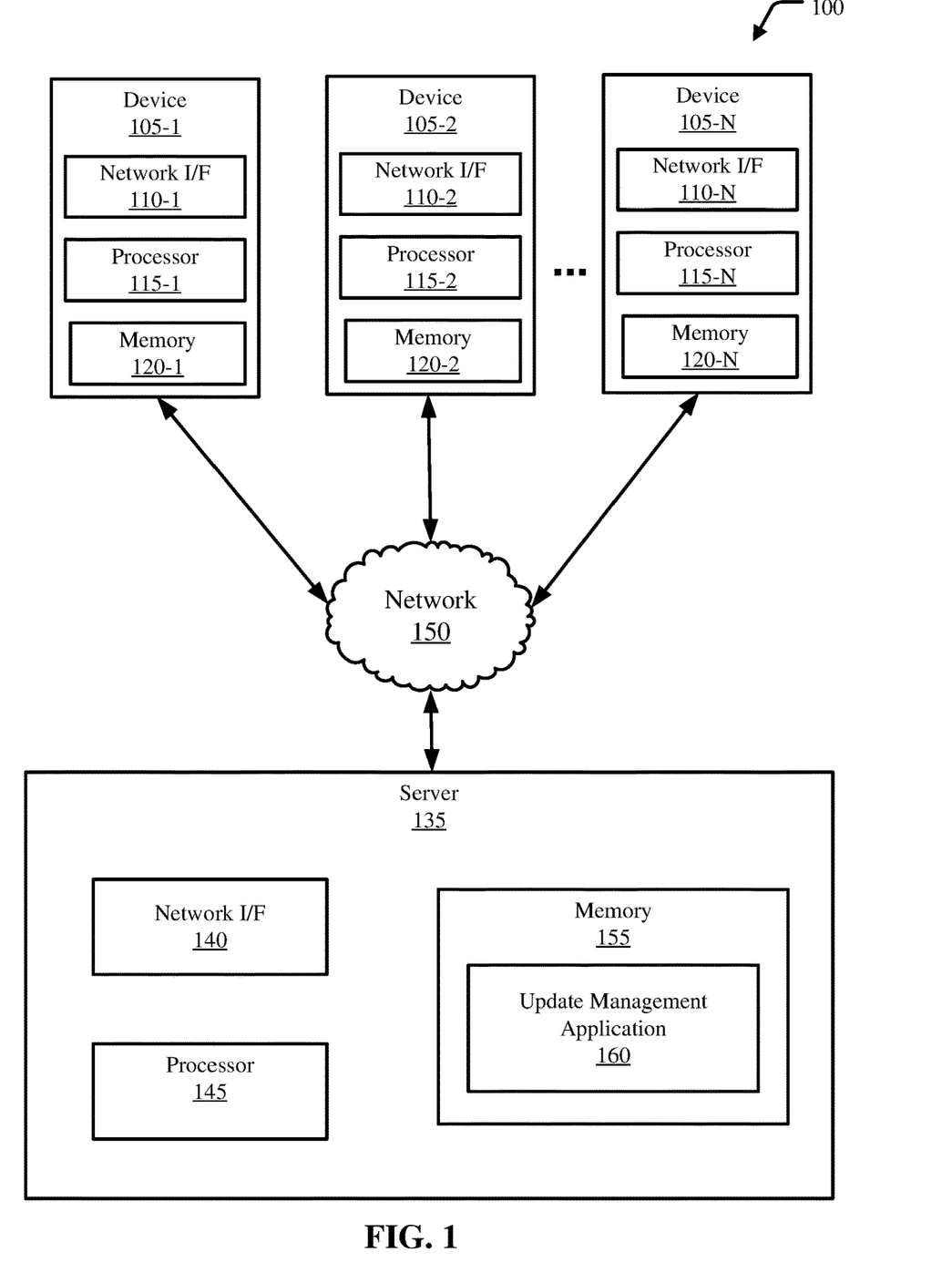
FIG. 1 is a block diagram illustrating an example computing environment in which illustrative embodiments of the present disclosure can be implemented.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

Consistent with various embodiments, the server 135 and the devices 105 are computer systems. The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, a biometric scanner, video camera, or other input device), and/or any commercially available or custom software (e.g., browser software, communications software, server software, natural language processing software, search engine and/or web crawling software, image processing software, etc.). The devices 105 and/or the server 135 can be servers, desktops, laptops, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150. In some embodiments, the network 150 may be substantially similar to, or the same as, cloud computing environment 50 described in FIG. 5.

The server 135 includes an update management application 160. The update management application 160 can be configured to manage concurrent updates to data within memory (e.g., memory 120 of the devices 105 or memory 155 of the server 135). The update management application 160 can be configured to detect the initiation of a first update (e.g., a transactional update) to a data set. A log of the data set, including an image of the data set before and after the update, can then be stored. A second update (e.g., a batch update) can then be detected. In response to detecting the second update, a determination can be made whether the second update collides with the first update. In embodiments, a collision can be determined in response to identifying that the first and second updates affect at least a portion of the same data (e.g., a record or data field) within the data set. In embodiments, the collision can be determined by referencing the log.

If a determination is made that there is no collision between the first and second updates, then the first and second updates can be processed normally. If a determination is made that there is a collision between the first and second update, then a collision policy can be referenced and followed. In embodiments, the collision policy can dictate the update to be committed (e.g., the first or the second update) on the data set. In embodiments, the collision policy can dictate that the data set should be rolled back (e.g., restored to a previous state) or rolled forward (e.g., restored to a previous state with recent transactions applied). In embodiments, the collision policy can dictate that the updates should be failed. In embodiments, the collision policy can dictate that the updates can be simultaneously committed. In some embodiments, the conflict policy can prompt a user to select a desired conflict action.

Various factors can be used to dictate the collision policy. The collision policy can be based on factors such as: the amount of collided data (e.g., the amount of data simultaneously being written to by two entities), the type of collided data (e.g., the type of data field at which collision occurs), the priority of entities writing to the record (e.g., an operating system (OS) writing to a record can be higher priority than an application writing to the record, a given application may have higher priority than another application, etc.), the timing of updates (e.g., a later update may be given priority over an earlier update or vice versa), the likelihood of data corruption (e.g., whether a data modification within the record will cause a catastrophe), and others.

Though reference is made to particular updates (e.g., batch updates and transactional updates), it is noted that the update management application 160 can be configured to manage any suitable received updates. As referenced herein, a "batch update" can refer to an update which does not depend on any other updates (e.g., a standalone update). A "transactional update" can refer to a series of updates that constitutes a single unit, with logical connections between interrelated updates. For example, a financial transaction between two parties constitutes a transactional update, as it requires a reduction in finances from a first account and a corresponding increase in finances to a second account.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
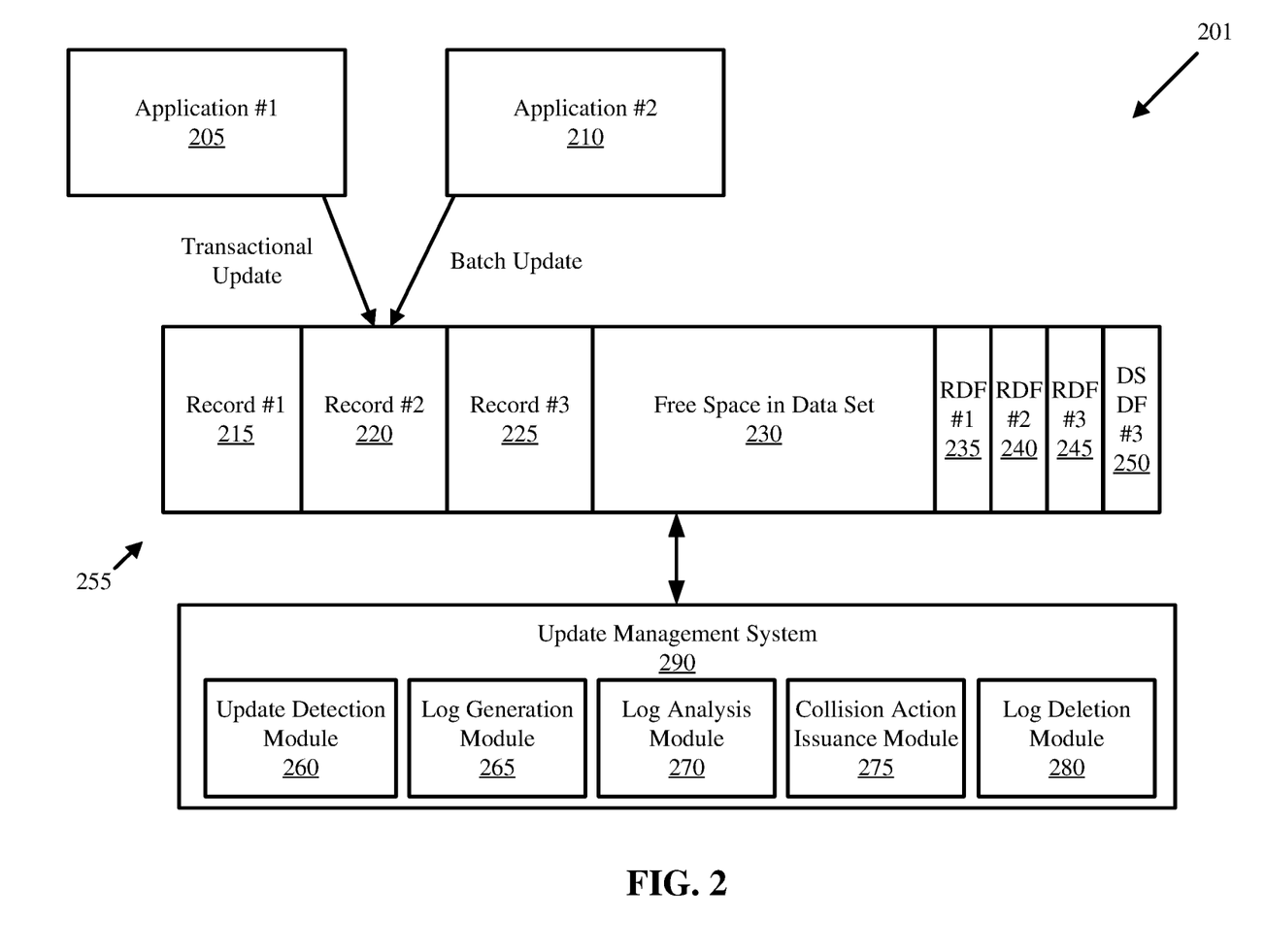
FIG. 2 is a block diagram illustrating an example computing environment including an update management system, in accordance with embodiments of the present disclosure.

Turning now to FIG. 2, illustrated is a block diagram of an example computing environment 200 in which illustrative embodiments of the present disclosure can be implemented. The computing environment 200 includes a first application 205, a second application 210, a data set 255, and an update management system 290. The various components illustrated in FIG. 2 can exist, if at all, across a plurality of servers and/or devices. For example, the first application 205 can be located on a first device (not shown), the second application 210 can be located on a second device (not shown), the data set 255 can be located on a third device (not shown), and the update management system 290 can be located on a first server (not shown). However, in some embodiments, all components can be located on a single device or server.

The data set 255 includes a first record 215, a second record 220, a third record 225 (collectively referred to as "records"), a free space 230, a first record descriptor field 235, a second record descriptor field 240, a third record descriptor field 245 (collectively referred to as "record descriptor fields"), and a data set descriptor field 250. The records can be data structures containing one or more fields for storing data. In embodiments, the records can be grouped into larger physical records or blocks for efficiency. As shown in FIG. 2, the records are grouped into the data set 255 with corresponding record descriptor (RDF) fields. The record descriptor fields can describe the length of each associated record (e.g., the first record descriptor field 235 can describe a length of the first record 215, the second record descriptor field 240 can describe a length of the second record 220, etc.). In embodiments, the RDFs can also be formatted such that the first RDF 235 indicates how many contiguous records are of the same length and the second RDF 240 indicates the record length. The data set descriptor field 250 can describe the length of the data set 255, including the amount of free space 230 for writing to existing records or writing additional records.

In embodiments, the data set 255 can be structured as a control interval (CI), a fixed-size block containing one or more records. Each CI can be accessible through a virtual storage access method (VSAM). Multiple CI's can be grouped into control areas (CA's) (not shown). CI's can be measured in bytes while CA's can be measured in disk tracks or cylinders. In embodiments, record length can be variable. That is, the first record 215 can have a first length, the second record 220 can have a second length, and the third record 225 can have a third length.

As depicted in FIG. 2, the first application 205 and second application 210 are attempting to simultaneously (i.e., concurrently) update the data set 255. In particular, the first application 205 initiates a transactional update on the second record 220 and the second application 210 initiates a batch update on the second record 220. Such a situation can lead to a collision where the same data within the second record 220 is updated simultaneously. This can lead to corruption of the data stored within the second record 220.

The update management system 290 can be configured to prevent or otherwise address collisions resulting from simultaneous updates within the data set 255. The update management system 290 includes an update detection module 260, a log generation module 265, a log analysis module 270, a collision action issuance module 275, and a log deletion module 280. The update detection module 260, log generation module 265, log analysis module 270, collision action issuance module 275, and log deletion module 280 can be processor-executable instructions that can be executed by a dedicated or shared processor using received inputs.

The update detection module 260 can be configured to detect updates to records within the data set 255. For example, the update detection module 260 can monitor and intercept read/write commands to be issued on the records (e.g., by a processor). In embodiments, the update detection module 260 can be configured to identify a location (e.g., a record or field within the data set 255) associated with the update. In this example, the update detection module 260 can detect the transactional update received from the first application 205 at a first time and the batch update received from the second application 205 at a second time.

The log generation module 265 can be configured to generate a log including an image of data within the data set 255 before and after an update. For example, in response to detecting the transactional update by the first application 205, the log generation module 265 can be configured to store a log containing the second record 220 prior to the transactional update and after the transactional update. Ultimately, the log captures the data that was changed (e.g., deleted, modified, or added) within the second record 220 in response to a particular transaction being initiated. A log can similarly be generated in response to receiving the batch update from the second application 210.

The log analysis module 270 can be configured to analyze the log data generated by the log generation module 265. In embodiments, the log analysis module 270 is triggered in response to a second update being detected by the update detection module 260 at a second time.

The log analysis module 270 can be configured to determine whether a received second update is directed to a target storage location (e.g., second record 220) associated with a first update. This can be completed by determining a target storage location of the second update and determining whether there is an existing log generated for the target storage location. The existing log for the target storage location can be indicative of a pending update. In this example, upon receiving the batch update from the second application 210, the log analysis module 270 can be configured to conclude that the batch update is directed to the second record 220 for which there is an existing log. As such, the log analysis module 270 concludes that there may be a conflict between the transactional update and batch update as they are both attempting to modify the same record.

Upon determining that the batch update is directed to the second record 220 having a pending transactional update, the log analysis module 270 can be configured to inspect the transactional update log to determine whether the batch update conflicts with the transactional update. In embodiments, the write locations (e.g., data fields) of the batch update are determined (e.g., based on a log generated for the batch update or based on an indication of the storage target location by the update detection module 260) and compared to the transactional update log. If there are any shared write locations between the batch and transactional updates, the log analysis module 270 can be configured to conclude a collision (i.e., conflict) between the batch update and transactional update. In this example, because the first application 205 and second application 210 are writing to the same fields within the second record 220, the log analysis module 270 determines an update collision between the transactional update and the batch update.

The collision action issuance module 275 receives the indication of the update collision between the transactional update received from the first application 205 and the batch update received from the second application 210 from the log analysis module 270. The collision action issuance module 275 then issues a collision action to resolve the collision. In some embodiments, the collision action issued by the collision action issuance module 275 is based on a predetermined policy for handling collisions. The policy can be based on factors such as: the amount of collided data (e.g., the amount of data simultaneously being written to by two entities), the type of data field associated with the collision, the priority of entities writing to the record (e.g., an operating system (OS) writing to a record can be higher priority than an application writing to the record, a given application may have higher priority than another application, a transaction write may have a higher priority than a batch write, etc.), the timing of updates (e.g., a later update may be given priority over an earlier update or vice versa), the likelihood of data corruption (e.g., whether a data modification within the record will cause a catastrophe), and others.

Various collisions actions can be implemented. In some embodiments, a roll back or roll forward can be performed on the affected data. For example, in response to determining a collision at the second record 220, the data in the second record 220 can be rolled back to a previous state. In embodiments, after a rollback is performed, updates can be reattempted at a later time. In some embodiments, the updates can be allowed to simultaneously process on the record. This can be completed in situations where collision cannot possibly cause data corruption. In some embodiments, the updates can be failed. This can be completed such that neither update is committed to the record. In some embodiments, an update can be selected for commitment over another pending update. In some embodiments, a user can be prompted to select a collision action in response to detecting a collision.

The log deletion module 280 receives an indication of a collision action issued by the collision action issuance module 275. The log deletion module 280 can then be configured to delete any existing logs associated with records within the data set 255. For example, if a first log is generated for the transactional update received by the first application 205 and a second log is generated for the batch update received by the second application 210, then the log deletion module 280 can be configured to delete the first and second logs after an indication is received that the collision was resolved by the collision action issuance module 275. Deletion of the logs upon committed transactions and/or resolved collisions can ensure that logs are only open for pending updates. This enables detection of potential collisions caused by subsequent updates if existing logs associated with records are identified.

It is noted that FIG. 2 is intended to depict the representative major components of an example computing environment 200. In some embodiments, however, individual components can have greater or lesser complexity than as represented in FIG. 2, components other than or in addition to those shown in FIG. 2 can be present, and the number, type, and configuration of such components can vary.

Figure 3:
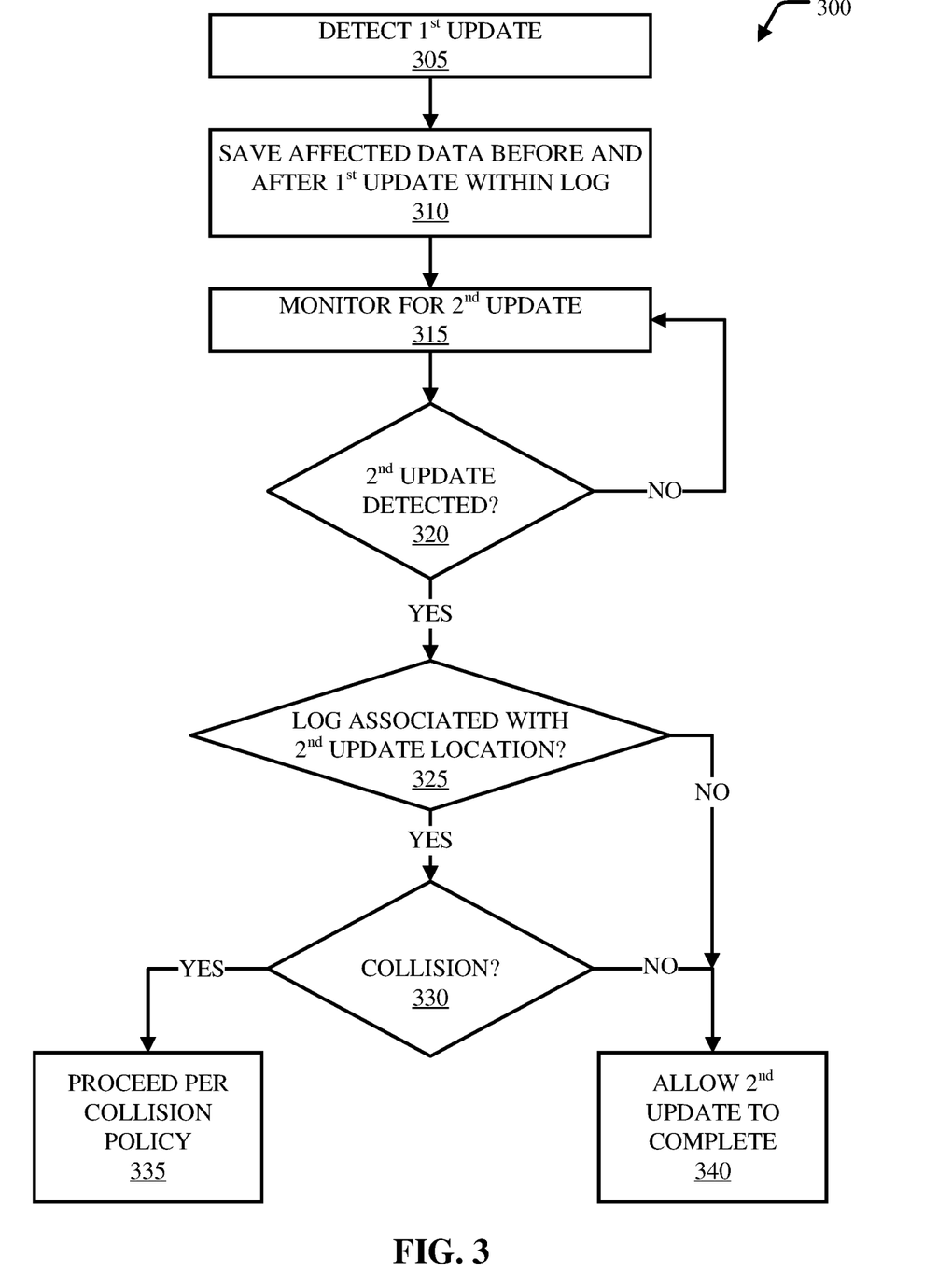
FIG. 3 is flow-diagram illustrating an example method for managing concurrent updates on data, in accordance with embodiments of the present disclosure.

FIG. 3 is a flow diagram illustrating an example method 300 for managing concurrent updates to data, in accordance with embodiments of the present disclosure. Method 300 initiates at operation 305, where a first update is detected. In embodiments, the update can be a transactional or batch update. The update can be detected by monitoring and/or intercepting read/write commands issued by a processor, memory controller, or other hardware module. Upon receiving an indication of a first update, a log is saved containing the affected data prior to and subsequent to the first update. This is illustrated at operation 310.

A second update is then monitored for. This is illustrated at operation 315. A determination is then made whether a second update is detected. This is illustrated at operation 320. If a determination is made that a second update is not detected, then method 300 returns to operation 315, where updates are continually monitored. Thus, method 300 may loop between operations 315 and 320 until a second update is detected (e.g., while the first update is pending). In embodiments, if a second update is not detected by the time the first update is committed, method 300 can end as there is not a concurrent update.

If a determination is made that a second update is detected, then method 300 proceeds to operation 325 where a determination is made whether a log corresponding to the location of the second update exists. Determining whether a log corresponding to the location of the second update exists can be completed by referencing the write location of the second update. The write location of the second update can be used to scan for logs existing for records or fields associated with stored data.

If a determination is made that no log corresponding to the location of the second update exists, then the second update is directed to different data than the first update, and thus, the second update is allowed to be committed. This is illustrated at operation 340. Upon commitment of the first and second updates, logs corresponding to the first or second updates can be deleted (if applicable).

If a log corresponding to the location of the second update exists, there may be a collision between the first and second update. As such, if a log corresponding to the location of the second update exists, a determination is made whether there is a collision. This is illustrated at operation 330. Determining whether there is a collision can be completed by referencing the log saved at operation 310 as compared to the update location of the second update. If any records or fields overlap between the first and second update, then a determination is made that there is a collision. If a determination is made that there is a collision at operation 330, then a collision policy is referenced and followed. This is illustrated at operation 335.

The collision policy can be based on factors such as: the amount of collided data (e.g., the amount of data simultaneously being written to by two entities), the type of data field associated with the collision, the priority of entities writing to the record (e.g., a given application may have higher priority than another application, etc.), the timing of updates (e.g., a later update may be given priority over an earlier update or vice versa), the likelihood of data corruption (e.g., whether a data modification within the record will cause a catastrophe), a comparison between the amount of data written by the two updates (e.g., if a first update is 100 MB of data and the second update is 1 MB of data, the first update may be given priority and thus may be committed over the second update), and others.

Various collision actions can be implemented based on the collision policy. In some embodiments, a roll back or roll forward can be performed on the affected data. In embodiments, after a rollback is performed, updates can be reattempted at a later time. In some embodiments, the updates can be allowed to simultaneously process on the record. In some embodiments, the updates can be failed. This can be completed such that neither update is committed to the record. In some embodiments, an update can be selected for commitment over another pending update. In some embodiments, a user can be prompted to select a collision action in response to detecting a collision. Upon resolving the collision and/or committing applicable data, logs associated with the first and/or second updates can be deleted.

If a determination is made that there is not a collision (e.g., there are no records or data fields being simultaneously updated), then the second update is allowed to be committed at operation 340.

The aforementioned operations can be completed in any order and are not limited to those described. Additionally, some, all, or none of the aforementioned operations can be completed, while still remaining within the spirit and scope of the present disclosure.

Figure 4:
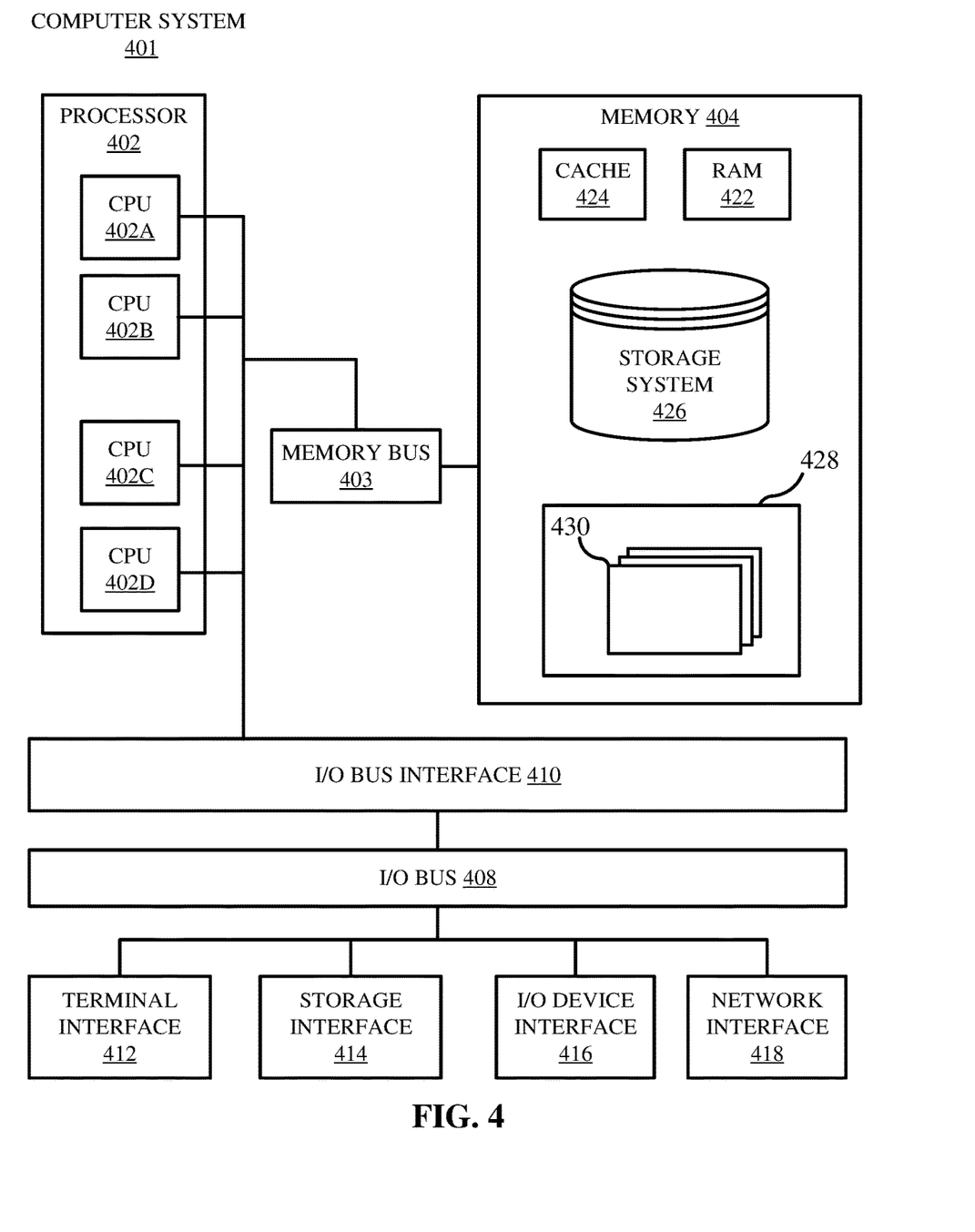
FIG. 4 is a high-level block diagram illustrating an example computer system that can be used in implementing one or more of the methods, tools, and modules, and any related functions described herein, in accordance with embodiments of the present disclosure.

Referring now to FIG. 4, shown is a high-level block diagram of an example computer system 401 that may possibly be utilized in various devices discussed herein (e.g., devices 105, server 135, update management system 290)

and that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402 (also referred to as processors herein), a memory 404, a terminal interface 412, a storage interface 414, an I/O (Input/Output) device interface 416, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

Memory 404 may include computer system readable media in the form of volatile memory, such as random-access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

In some embodiments, the program modules 430 of the computer system 401 include a concurrent update management module. The concurrent update management module can be configured to detect a transactional update on at least one record within a data set. The concurrent update management module can be configured to generate a log for the transactional update, the log including an image of the at least one record within the data set before the update. The concurrent update management module can be configured to determine whether the batch update collides with the transactional update by referencing the log. In response to determining that the batch update collides with the transactional update, a collision policy can be referenced. A collision action indicated in the collision policy can then be issued by the concurrent update management module.

Although the memory bus 403 is shown in FIG. 4 as a single bus structure providing a direct communication path among the CPUs 402, the memory 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
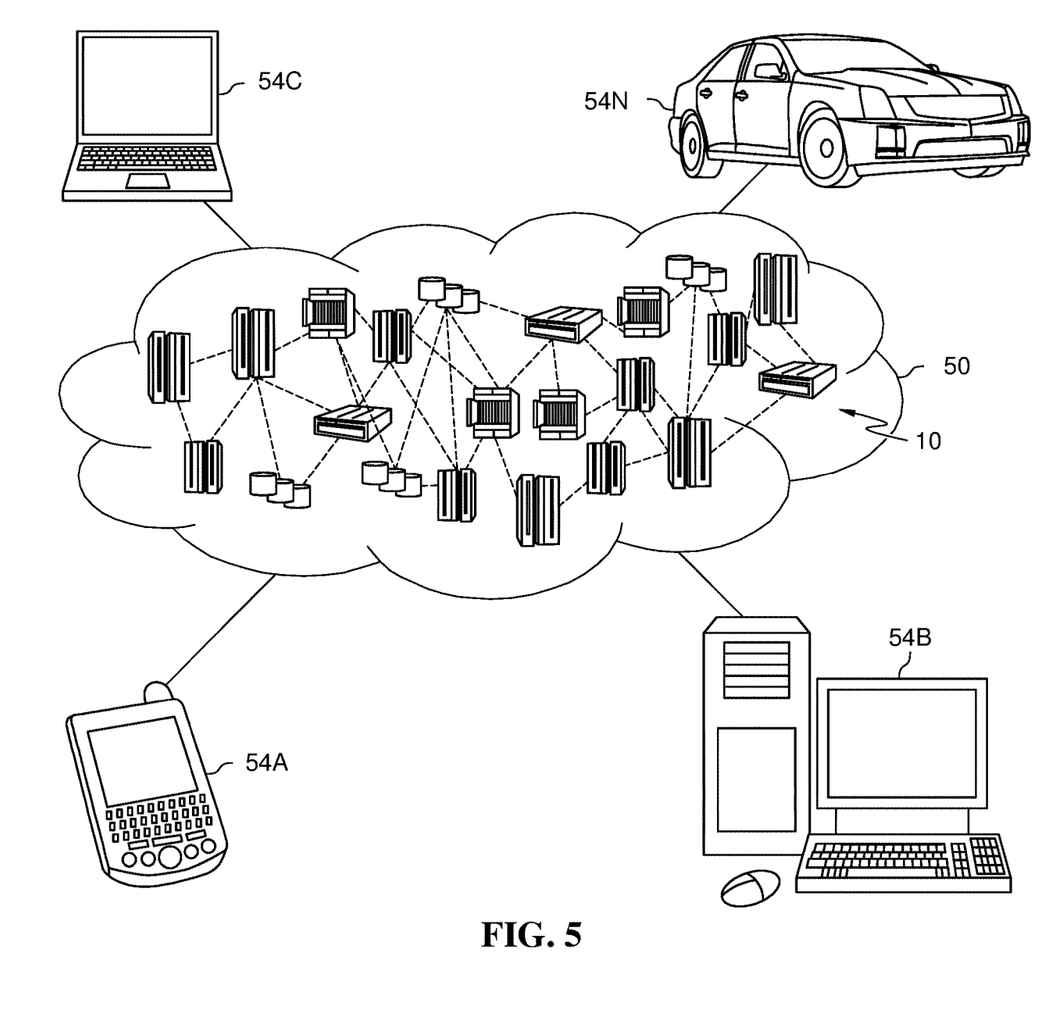
FIG. 5 is a diagram illustrating a cloud computing environment, in accordance with embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105), desktop computer 54B (e.g., server 135, update management system 290), laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
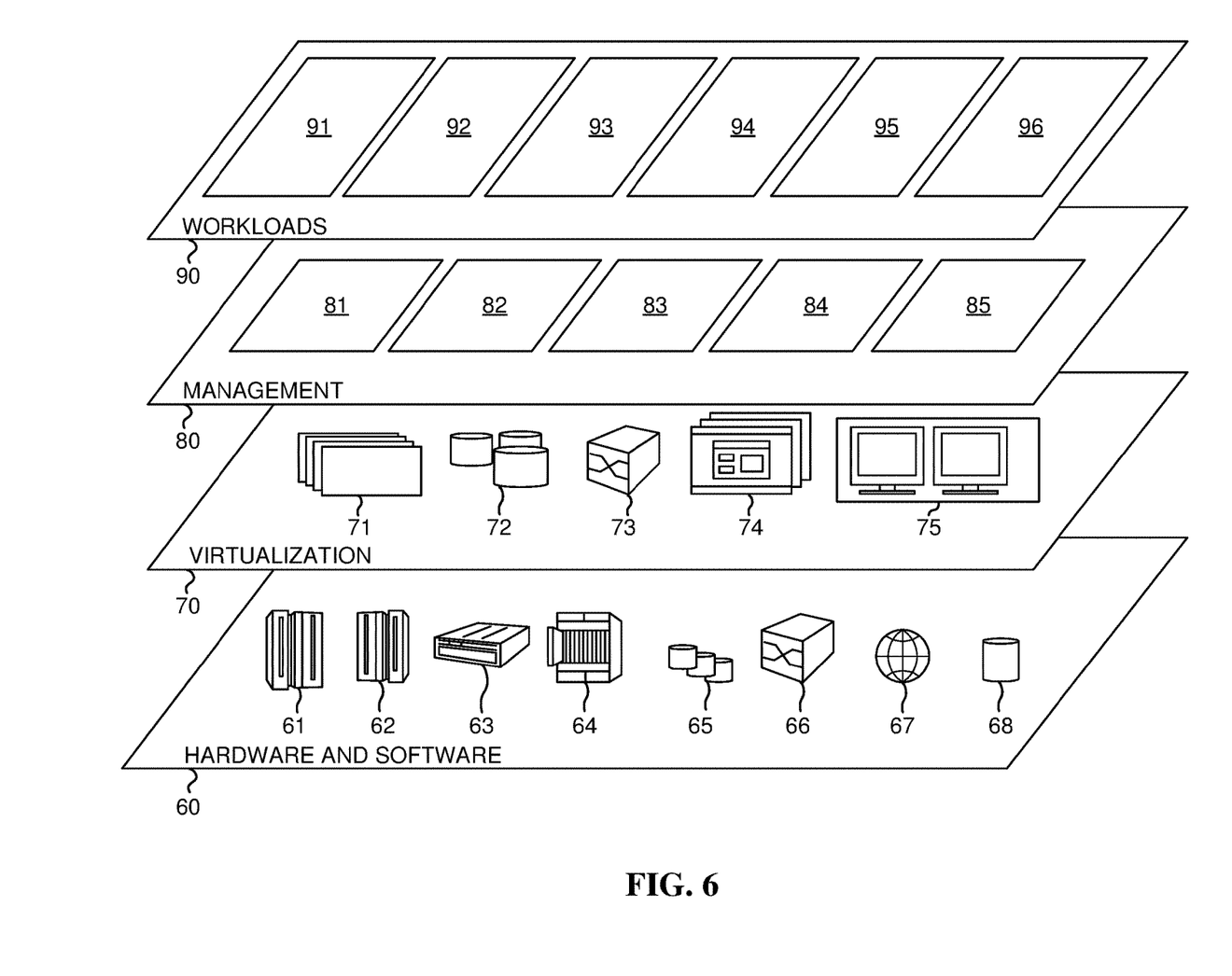
FIG. 6 is a block diagram illustrating abstraction model layers, in accordance with embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized.

Examples of workloads and functions which may be provided from this layer include: mapping and navigation 91; software development and lifecycle management 92; virtual classroom education delivery 93; data analytics processing 94; transaction processing 95; and concurrent update management 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a standalone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used, and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
   detecting a transactional update on at least one record within a control interval of a control area received from an operating system accessed via a virtual storage access method (VSAM);
   generating a log for the transactional update, the log including an image of the at least one record within the control interval before the transactional update;
   detecting a batch update received from a first application;
   determining whether the batch update collides with the transactional update by comparing update locations associated with the transactional update within the generated log to update locations associated with the batch update;
   referencing, in response to determining that the batch update collides with the transactional update based on a determination that the transactional update and batch update are updating the same data field based on the comparing, a collision policy;
   comparing, according to the collision policy, the amount of data written by the transactional update and the batch update;
   determining that the amount of data written by the transactional update exceeds the amount of data written by the batch update;
   determining, according to the collision policy, that a priority of the transactional update exceeds a priority of the batch update based on the transactional update being received from the operating system and the batch update being received from the first application;
   determining, according to the collision policy, that the transactional update and batch update will cause an error if they are both simultaneously processed; and
   issuing a collision action indicated in the collision policy, the collision policy specifying that the transactional update should be processed over the batch update based on the amount of data written by the transactional update exceeding the amount of data written by the batch update, based on the priority of the transactional update exceeding the priority of the batch update, and based on the determination that the transactional update and batch update will cause an error if they are both simultaneously processed.

2. The method of claim 1, wherein issuing the collision action includes:
   rolling back the at least one record to a previous state;
   receiving the transactional update at a later time; and
   committing the transactional update to the at least one record.

3. The method of claim 1, further comprising:
   detecting a second transactional update on at least one record within a second control interval at a second time;
   generating a second log for the second transactional update, the second log including an image of the at least one record within the second control interval before the second transactional update;
   detecting a second batch update;
   determining whether the second batch update collides with the second transactional update by referencing the second log; and
   committing, in response to determining that the second batch update collides with the second transactional update, the second batch update.

4. A system comprising:
   a memory storing program instructions; and a processor, wherein the processor is configured to execute the program instructions to perform a method comprising:
detecting a transactional update on at least one record within a control interval of a control area received from an operating system accessed via a virtual storage access method (VSAM);
generating a log for the transactional update, the log including an image of the at least one record within the control interval before the transactional update;
detecting a batch update received from a first application;
determining whether the batch update collides with the transactional update by comparing update locations associated with the transactional update within the generated log to update locations associated with the batch update;
referencing, in response to determining that the batch update collides with the transactional update based on a determination that the transactional update and batch update are updating the same data field based on the comparing, a collision policy;
comparing, according to the collision policy, the amount of data written by the transactional update and the batch update;
determining that the amount of data written by the transactional update exceeds the amount of data written by the batch update;
determining, according to the collision policy, that a priority of the transactional update exceeds a priority of the batch update based on the transactional update being received from the operating system and the batch update being received from the first application;
determining, according to the collision policy, that the transactional update and batch update will cause an error if they are both simultaneously processed; and
issuing a collision action indicated in the collision policy, the collision policy specifying that the transactional update should be processed over the batch update based on the amount of data written by the transactional update exceeding the amount of data written by the batch update, based on the priority of the transactional update exceeding the priority of the batch update, and based on the determination that the transactional update and batch update will cause an error if they are both simultaneously processed.

5. The system of claim 4, wherein the collision policy facilitates collision actions to be issued based on a timing of updates.

6. The system of claim 4, wherein issuing the collision action includes:
rolling back the at least one record to a previous state;
receiving the transactional update at a later time; and
committing the transactional update to the at least one record.

7. The system of claim 4, wherein the method performed by the processor further comprises:
detecting a second transactional update on at least one record within a second control interval at a second time;
generating a second log for the second transactional update, the second log including an image of the at least one record within the second control interval before the second transactional update;
detecting a second batch update;
determining whether the second batch update collides with the second transactional update by referencing the second log; and committing, in response to determining that the second batch update collides with the second transactional update, the second batch update.

8. A computer program product comprising a computer readable storage medium having program instructions embodied therewith, the program instructions executable by a processor to cause the processor to perform a method comprising:
detecting a transactional update on at least one record within a control interval of a control area received from an operating system accessed via a virtual storage access method (VSAM);
generating a log for the transactional update, the log including an image of the at least one record within the control interval before the transactional update;
detecting a batch update received from a first application;
determining whether the batch update collides with the transactional update by comparing update locations associated with the transactional update within the generated log to update locations associated with the batch update;
referencing, in response to determining that the batch update collides with the transactional update based on a determination that the transactional update and batch update are updating the same data field based on the comparing, a collision policy;
comparing, according to the collision policy, the amount of data written by the transactional update and the batch update;
determining that the amount of data written by the transactional update exceeds the amount of data written by the batch update;
determining, according to the collision policy, that a priority of the transactional update exceeds a priority of the batch update based on the transactional update being received from the operating system and the batch update being received from the first application;
determining, according to the collision policy, that the transactional update and batch update will cause an error if they are both simultaneously processed; and
issuing a collision action indicated in the collision policy, the collision policy specifying that the transactional update should be processed over the batch update based on the amount of data written by the transactional update exceeding the amount of data written by the batch update, based on the priority of the transactional update exceeding the priority of the batch update, and based on the determination that the transactional update and batch update will cause an error if they are both simultaneously processed.

9. The computer program product of claim 8, wherein issuing the collision action includes:
rolling back the at least one record to a previous state;
receiving the transactional update at a later time; and
committing the transactional update to the at least one record.

10. The computer program product of claim 8, wherein the method performed by the processor further comprises:
detecting a second transactional update on at least one record within a second control interval at a second time;
generating a second log for the second transactional update, the second log including an image of the at least one record within the second control interval before the second transactional update;
detecting a second batch update;

determining whether the second batch update collides with the second transactional update by referencing the second log; and committing, in response to determining that the second batch update collides with the second transactional update, the second batch update.

\* \* \* \* \*